(12) United States Patent
Ohira

(10) Patent No.: US 7,236,527 B2
(45) Date of Patent: Jun. 26, 2007

(54) MOTION VECTOR SEARCH APPARATUS AND METHOD

(75) Inventor: Tadashi Ohira, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 10/431,784

(22) Filed: May 8, 2003

(65) Prior Publication Data

US 2003/0215015 A1  Nov. 20, 2003

(30) Foreign Application Priority Data

May 8, 2002  (JP) .............................. 2002-132839

(51) Int. Cl.
  *H04N 7/12* (2006.01)
(52) U.S. Cl. ................................ 375/240.16
(58) Field of Classification Search ................ 348/154, 348/155, 669, 416, 699, 407; 382/107, 232, 382/236, 239, 420, 421, 171, 422, 413, 416, 382/407; 375/240.16, 240.24, 240.26, 240.12, 375/240.01, 240.2, 240.3
  See application file for complete search history.

(56) References Cited

U.S. PATENT DOCUMENTS

| | | | |
|---|---|---|---|
| 5,161,247 A * | 11/1992 | Murakami et al. ............ | 712/36 |
| 5,818,969 A * | 10/1998 | Astle .......................... | 382/236 |
| 6,269,174 B1 * | 7/2001 | Koba et al. ................. | 382/107 |
| 2003/0123550 A1 * | 7/2003 | Wang et al. ........... | 375/240.16 |
| 2003/0161400 A1 * | 8/2003 | Dinerstein et al. ..... | 375/240.16 |
| 2005/0238103 A1 * | 10/2005 | Subramaniyan et al. .................................................... | 375/240.16 |

* cited by examiner

*Primary Examiner*—Tung Vo
*Assistant Examiner*—Behrooz Senfi
(74) *Attorney, Agent, or Firm*—Fitzpatrick, Cella, Harper & Scinto

(57) ABSTRACT

A motion vector search apparatus and method that search for inter-frame motion vectors of motion pictures are provided. The motion vector search apparatus and method involve: inputting a search target frame to be coded; inputting as a reference frame a frame on which a motion vector search has been performed; by using each of a plurality of specific blocks set within the search target frame and each corresponding one of reference blocks set within the reference frame, performing a block matching for each of the specific blocks within a predetermined range of the reference frame; determining a search pattern for a motion vector for the entire frame according to block matching results for the plurality of specific blocks; by using the search pattern determined, executing a block matching in predetermined units of blocks on the inputted search target frame to be encoded; and generating motion vectors.

7 Claims, 12 Drawing Sheets

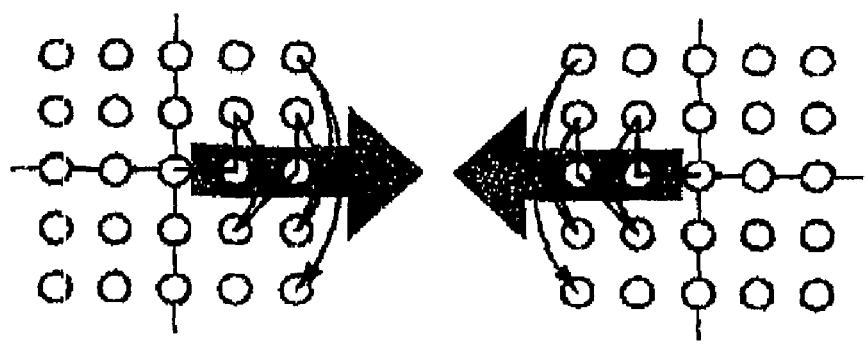
Fig. 5 (a)          Fig. 5 (e)
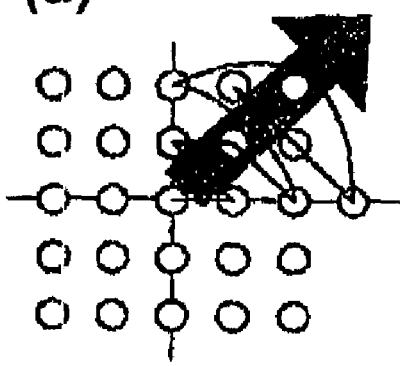 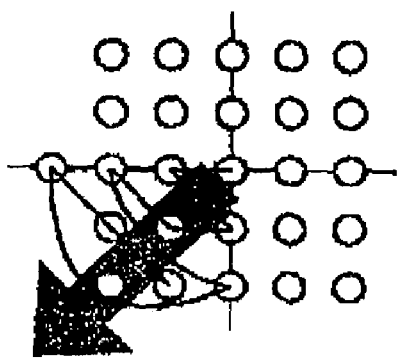
Fig. 5 (b)          Fig. 5 (f)
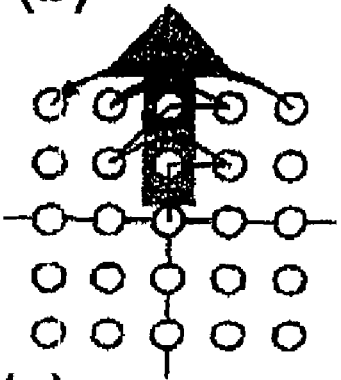 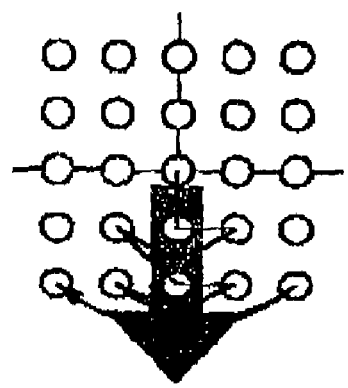
Fig. 5 (c)          Fig. 5 (g)
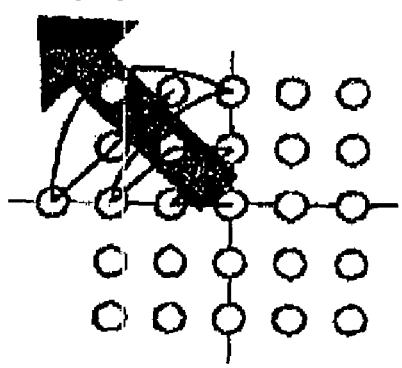 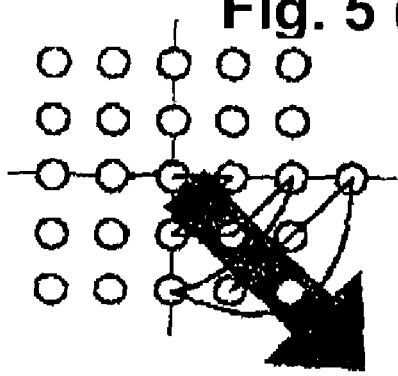
Fig. 5 (d)          Fig. 5 (h)

MOTION VECTOR SEARCH APPARATUS AND METHOD

BACKGROUND OF THE INVENTION

1. Field of the Invention

The present invention relates to motion vector search apparatus and method that favorably search for motion vectors between frames of digital moving pictures.

2. Related Background Art

Conventionally, a block matching method has been frequently used as a motion vector search method in a motion compensation inter-frame prediction coding method.

The block matching method is a method in which a block in a reference frame in the same position as a motion search target block (N×N pixel area) is used as a center to calculate matching evaluation functions with blocks that shifted in units of pixels within a search range of ±M×±M pixels, the best matching block is searched, and the amount and direction of the shift to the matching block is used as the motion vector. As the matching evaluation function, a sum of absolute values of differences between pixel values calculated on a pixel to pixel basis for all pixels within the block (i.e., a difference evaluation value) may be used, for example.

The block matching method, however, has a problem in that searches must be conducted a great number of times, which requires an enormous amount of calculation when this system is realized. For this reason, various simplification techniques such as a method of searching with multiple steps, such as, for example, a 3-step search method have been suggested.

In the 3-step search method, a search is made at rough search-point intervals as the first step, and then the second search is made at search-point intervals each of which is a half of the interval for the first step around the best matching position as a center, instead of the all-pixel position search. In this manner, in the 3-step search method, the same process is repeated in a plurality of steps to narrow the coarse search-point intervals to close ones, thereby searching for a motion vector.

Accordingly, the amount of calculation can be significantly reduced with the 3-step search method than with the block matching method that performs the all-pixel position search described above. However, the 3-step search method entails a possibility of finding a motion vector completely different from the search direction sought if an erroneous search is made in the first step.

SUMMARY OF THE INVENTION

Due to the background described above, the present invention takes the circumstances described above into consideration and relates to a motion vector search apparatus and a motion vector search method that can reduce the number of searches in block matching and search for the motion vector at higher speed and more appropriately.

To this end, in accordance with a preferred embodiment of the present invention, there is provided a motion vector search apparatus that searches for an inter-frame motion vector of motion pictures, the motion vector search apparatus comprising: a target frame input component to input a search target frame to be coded; a reference frame input component to input as a reference frame a frame on which a motion vector search has been performed; a search pattern determination component that uses specific blocks set within the search target frame and reference blocks set within the reference frame to perform a block matching within a predetermined range of the reference frame and determine a search pattern for a motion vector for the entire frame; and a motion vector search component that uses the search pattern determined by the search pattern determination component to execute a block matching in predetermined units of blocks on the inputted search target frame to be coded and generate a motion vector.

Furthermore, in accordance with a preferred embodiment of the present invention, a motion vector search method to search for an inter-frame motion vector of a motion picture, the motion vector search method comprising the steps of: a target frame input step of inputting a search target frame; a reference frame input step of inputting as a reference frame a frame on which a motion vector search has been performed; a search pattern determination step of performing a block matching within a predetermined range of the reference frame and determining a search pattern for a motion vector for the entire frame by using a specific blocks set within the search target frame and a reference blocks set within the reference frame; and a motion vector searching step of executing a block matching in predetermined units of blocks on the inputted search target frame to be coded and generate a motion vector by using the search pattern determined in the search pattern determination step.

Other objects, features and advantages of the invention will become apparent from the following detailed description taken in conjunction with the accompanying drawings.

BRIEF DESCRIPTION OF THE DRAWINGS

FIGS. 5(a)-5(h) are diagrams of search sequence pattern examples with eight directivities in search sequences.

DETAILED DESCRIPTION OF THE PREFERRED EMBODIMENTS

A motion vector search apparatus and a motion vector search method in accordance with preferred embodiments of the present invention will be described below in detail with reference to the accompanying drawings.

First Embodiment

First, in the present embodiment, a method to realize the present invention using the MPEG-4 encoding method (ISO/IEC 14496-2) will be described. In the MPEG-4 method, a natural picture is called a video object (VO). The VO is made up of a plurality of video object planes (VOP) photographed at given times. Each VOP corresponds to a frame, and is a basic unit of picture data treated in the MPEG-4. Each VOP is divided into macro blocks (MB), which are basic process units. The macro blocks are units that determine the encoding mode, as well as processing units to find a motion vector.

MPEG-4 version 1 supports a 4:2:0 picture format, and each macro block consequently consists of four luminance blocks and two color difference blocks, each made up of 8×8 pixels.

The VOP in which all MBs are intra-encoded (i.e., intra-picture encoding) are called I-VOP, and a frame that includes an inter-encoded (inter-picture encoding) mode among the MB encoding modes is called P-VOP. These two are the only encoding modes used in the present embodiment.

A plurality of frames forming a group is called a GOV (Group of VOPs), which always contains an I-VOP by a single frame only.

Next, a motion vector search processing in accordance with one feature of the present invention that takes place in an encoding processing will be described.

Figure 1:
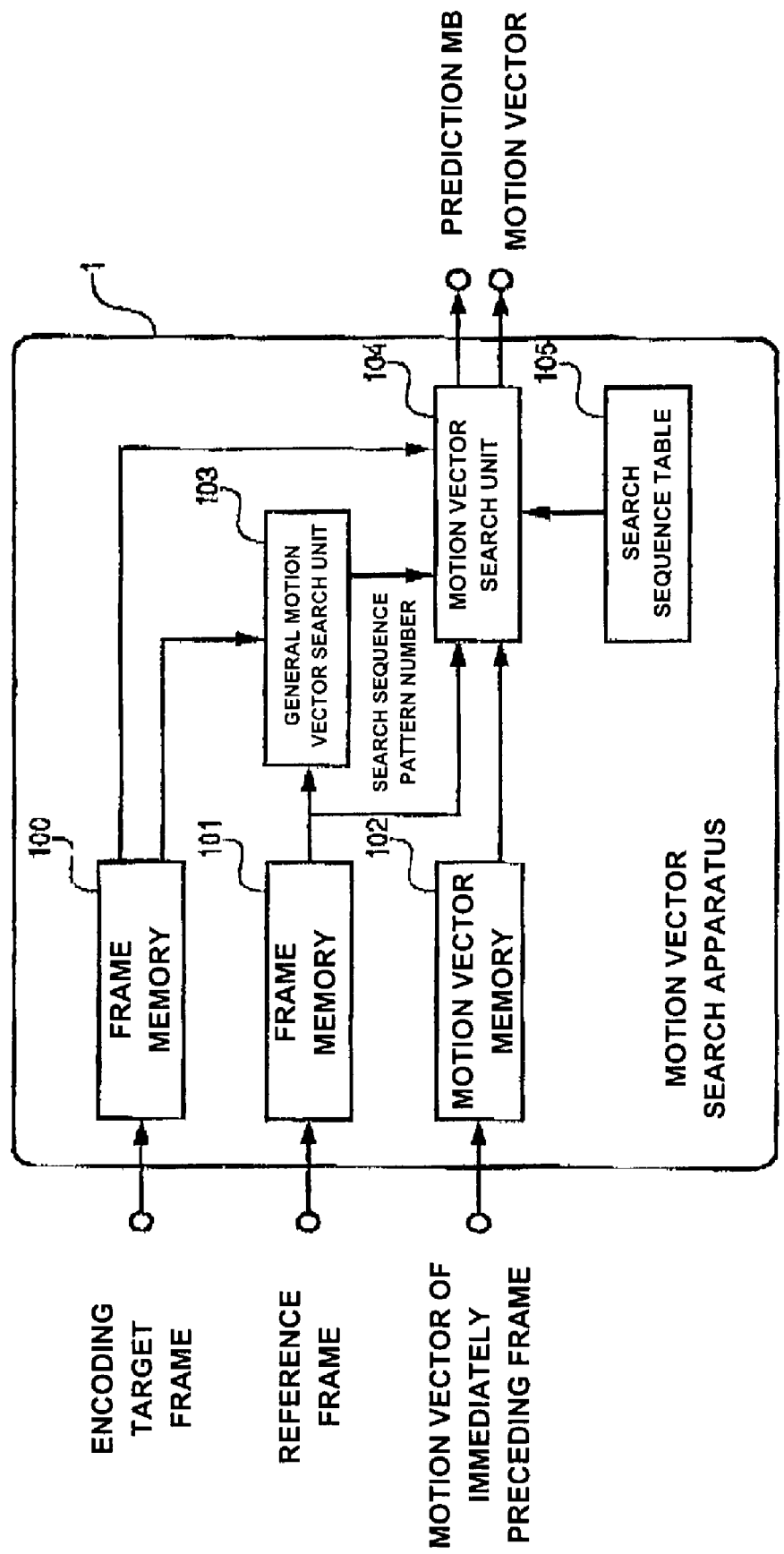
FIG. 1 is a block diagram of a configuration of a motion vector search apparatus according to a first embodiment of the present invention.

FIG. 1 is a block diagram of a configuration of a motion vector search apparatus according to the first embodiment of the present invention.

Referring to FIG. 1, a motion vector search apparatus 1 according to the present invention includes frame memories 100 and 101, a motion vector memory 102, a general motion vector search unit 103, a motion vector search unit 104, and a search sequence table 105.

The frame memory 100 is a memory that stores an encoding target frame, which is a frame that is to be encoded and inputted into the apparatus. The frame memory 101 is a memory that stores a reference frame that is referred to when performing a motion vector search, e.g., a previous frame for which a motion vector has been searched immediately preceding the current processing. In other words, according to the present embodiment, a reference frame is a previous frame that precedes the encoding target frame.

The motion vector memory 102 is a memory that stores the motion vector searched at the immediately preceding frame.

Figure 2:
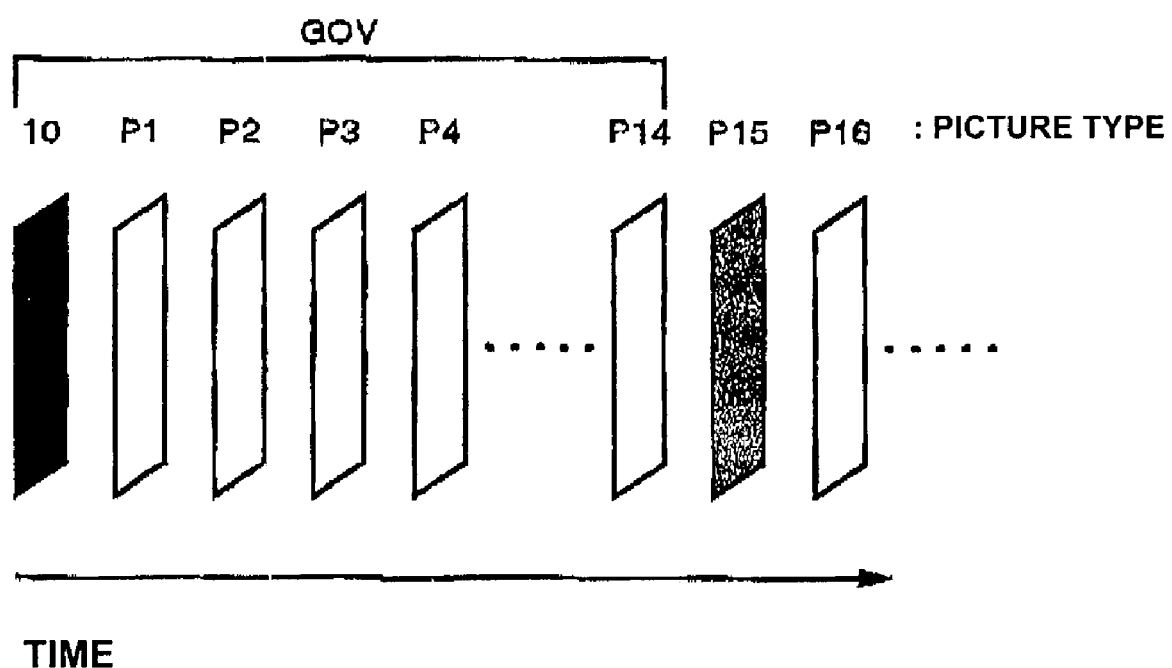
FIG. 2 is a diagram illustrating a frame configuration including I-VOPs and P-VOPs according to the present embodiment.

FIG. 2 is a diagram of a frame configuration including I-VOPs and P-VOPs according to the present embodiment. In the present embodiment, an I-VOP appears every 15 frames, with 14 frames of P-VOPs in between.

The search sequence table 105 stores a plurality of search sequence patterns indicating motion vector search sequences. The search sequence patterns used in the present embodiment are determined by concentrating on specifying the sequence or direction of a search in view of the fact that motion vectors often indicate a certain direction when the camera pans as it photographs pictures. The details of the search sequence patterns will be described later.

Predetermined specific macro blocks are inputted in the general motion vector search unit 103 from the encoding target frame stored in the frame memory 100. By comparing these macro blocks with the reference frame stored in the frame memory 101, a motion vector for each specific macro block can be searched. Furthermore, based on each of the motion vectors searched, the general motion vector search unit 103 outputs search sequence pattern number information for search sequence pattern stored in the search sequence table 105.

Figure 3:
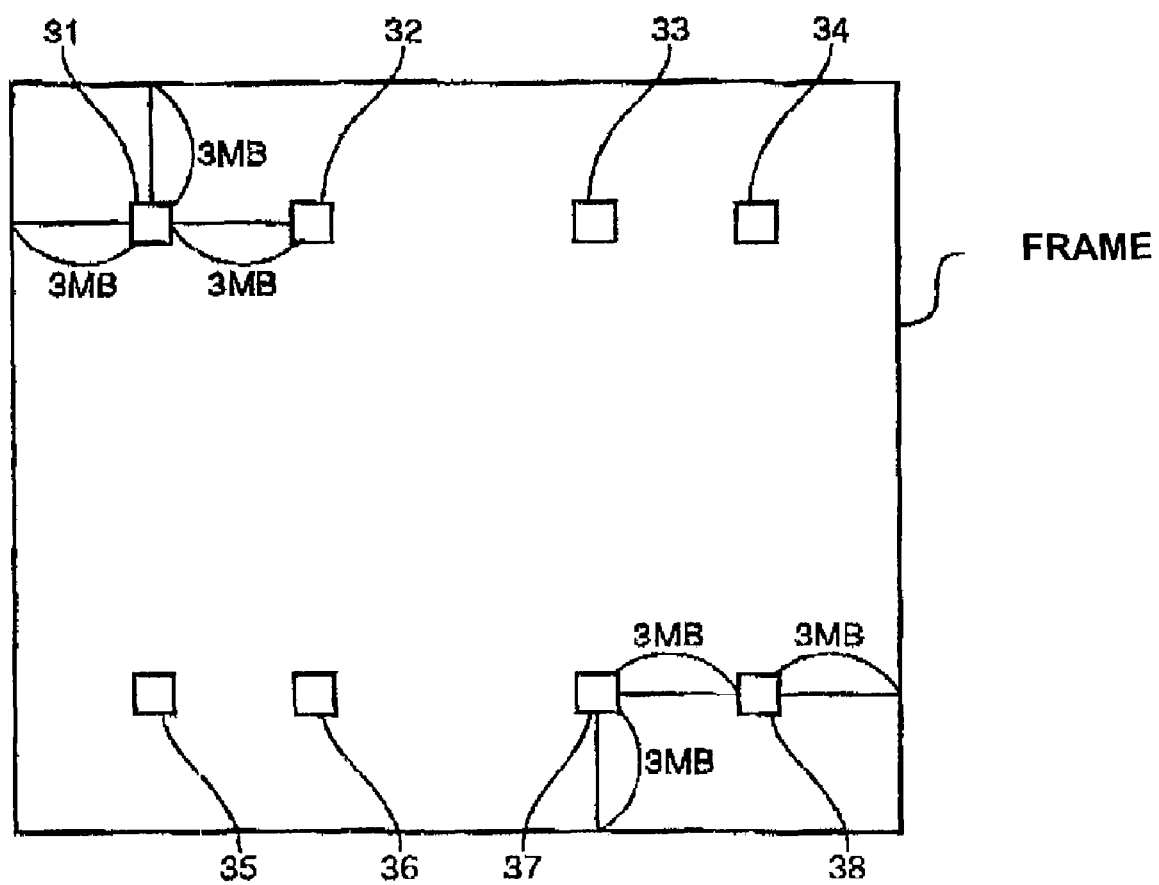
FIG. 3 is a diagram illustrating the positions of eight encoding target macro blocks set within a frame according to the present embodiment.

According to the present embodiment, eight macro blocks are set for each frame. FIG. 3 is a diagram indicating the positions of eight specific macro blocks set within a frame according to the present embodiment.

As shown in FIG. 3, specific macro blocks 31-38 each having a predetermined size are set at eight locations in one frame according to the present embodiment.

Based on the search sequence pattern number information outputted from the general motion vector search unit 103, the motion vector search unit 104 refers to search sequence patterns that are stored in the search sequence table 105 and that correspond to the search sequence pattern number information, and performs a motion vector search for all encoding target macro blocks. The motion vector search unit 104 outputs prediction macro blocks that are obtained as a result of the motion vector search, as well as their motion vectors.

Figure 4:
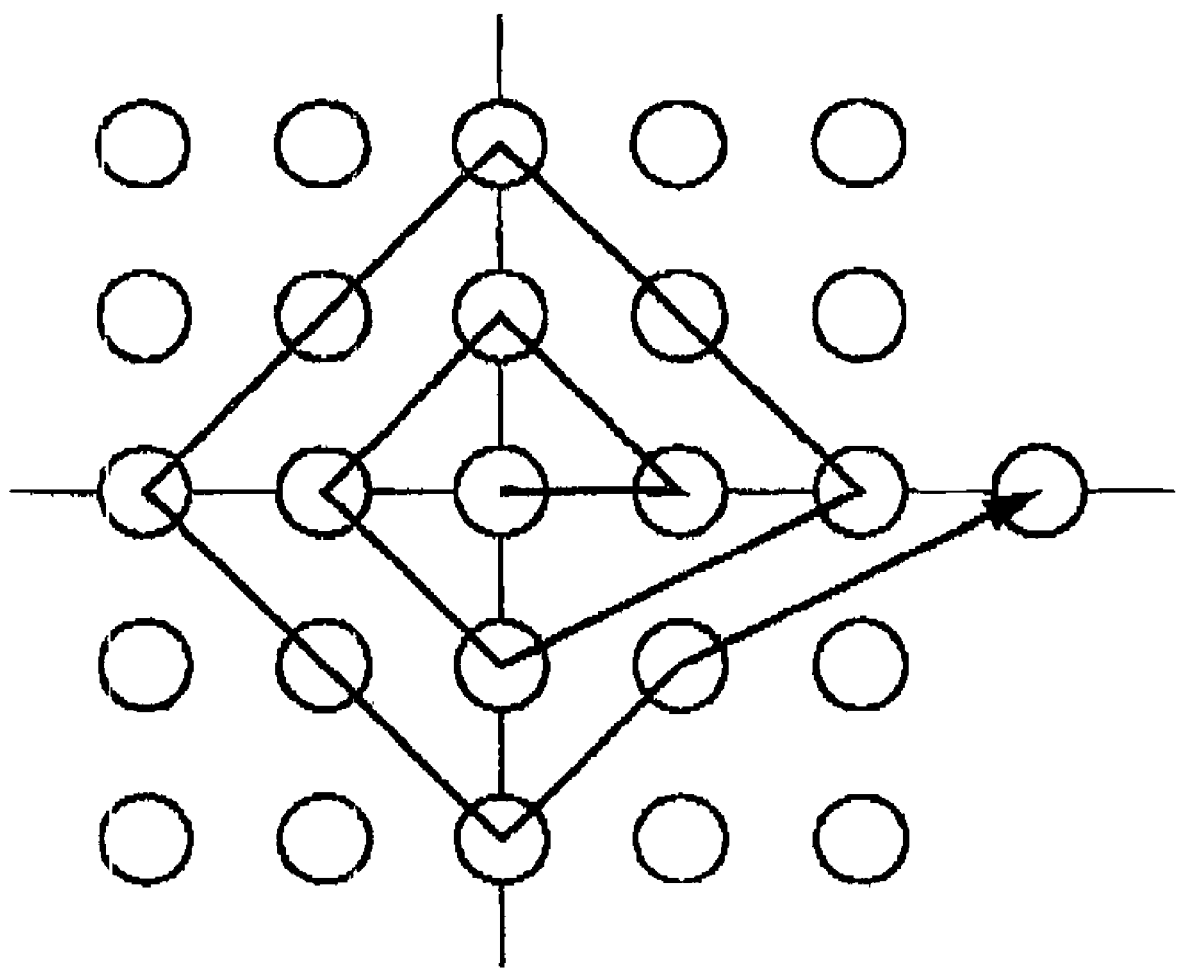
FIG. 4 is a diagram of one example of a search sequence pattern with an omnidirectional search sequence.

Referring to FIGS. 4 and 5, search sequence patterns stored in the search sequence table 105 will be described. In FIGS. 4 and 5, each circle in the figures represents one pixel and a search takes place in the order indicated by the arrows on the pixels.

FIG. 4 is a diagram of one example of a search sequence pattern with an omnidirectional search sequence. In the search sequence pattern example in FIG. 4, the search sequence pattern indicates a search whose sequence begins at the center and spirals outward. FIGS. 5(a)-5(h), on the other hand, show search sequence pattern examples with eight directivities in search sequences. It is assumed that the search sequence pattern in FIG. 4 has a search sequence pattern number "0," the search sequence pattern in FIG. 5(a) has a search sequence pattern number "1," the search sequence pattern in FIG. 5(b) has a search sequence pattern number "2," the search sequence pattern in FIG. 5(c) has a search sequence pattern number "3," the search sequence pattern in FIG. 5 (d) has a search sequence pattern number "4," the search sequence pattern in FIG. 5(e) has a search sequence pattern number "5," the search sequence pattern in FIG. 5(f) has a search sequence pattern number "6," the search sequence pattern in FIG. 5(g) has a search sequence pattern number "7," and the search sequence pattern in FIG. 5(h) has a search sequence pattern number "8." It is assumed that a predetermined search range is set for each of the search sequence patterns.

Next, an operation procedure of the motion vector search apparatus thus composed will be described.

Figure 6:
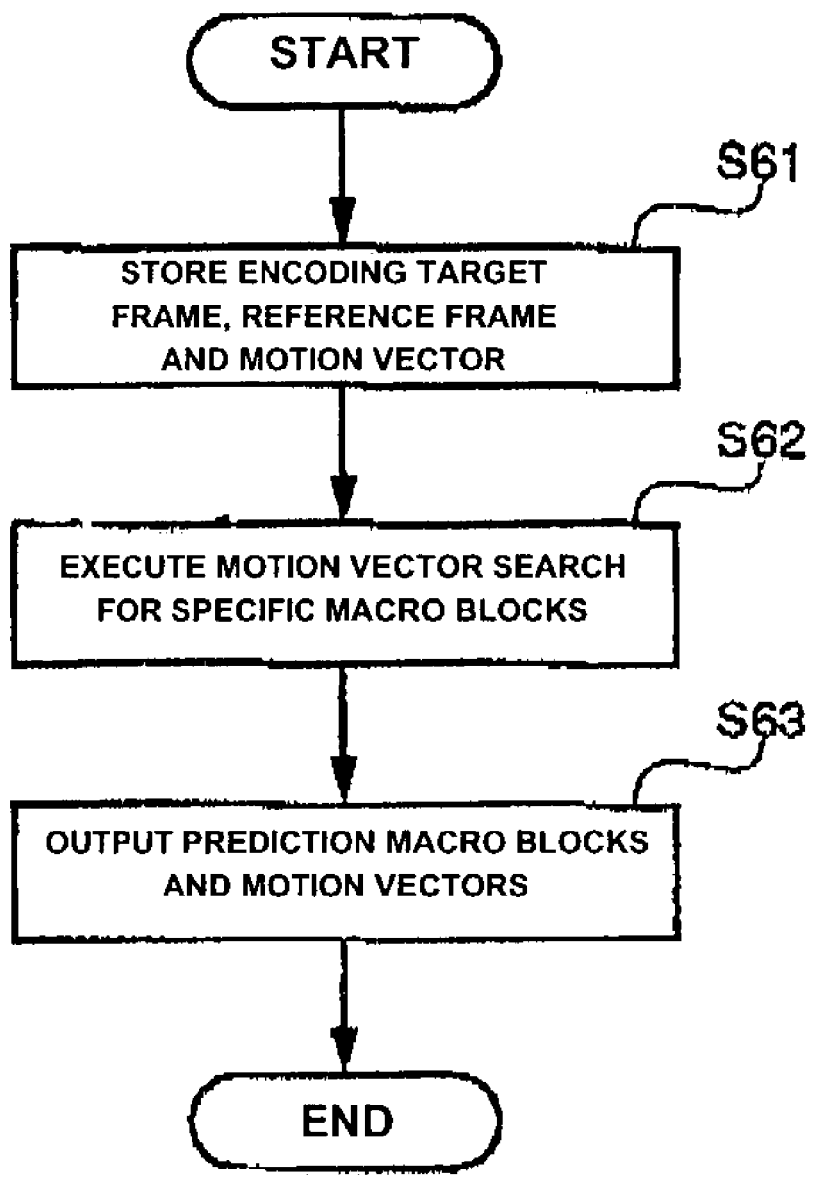
FIG. 6 is a flowchart for describing an operation procedure of the motion vector search apparatus according to the present invention.

FIG. 6 is a flowchart that describes the operation procedure of the motion vector search apparatus according to the present invention.

First, the description will be made as to the operation procedure that takes place when the immediately preceding frame is I-VOP and the encoding target frame is P-VOP.

The encoding target frame (P-VOP) is stored in the frame memory 100 of the motion vector search apparatus 1, while the reference frame (I-VOP) is stored in the frame memory 101 (step S61). Next, the general motion vector search unit 103 refers to the reference frame stored in the frame memory 101 and executes a motion vector search for the eight specific macro blocks 31-38 that are stored in the frame memory 100 (step S62). Based on the motion vector searched for each of the specific macro blocks 31-38, the general motion vector search unit 103 determines and outputs search sequence pattern numbers. The procedure to determine the search sequence pattern number is described in detail later.

Next, based on the search sequence pattern numbers outputted by the general motion vector search unit 103, the motion vector search unit 104 refers to the search sequence patterns in the search sequence table 105 that correspond to the numbers, and performs a motion vector search according to the search sequences of the search sequence patterns. Lastly, the motion vector search unit 104 outputs prediction macro blocks selected as a result of the search, as well as the motion vectors for the prediction macro blocks (step S63).

Next, the description will be made as to an operation procedure that takes place when the immediately preceding frame is P-VOP and the encoding target frame is also P-VOP.

First, the encoding target frame (P-VOP) is stored in the frame memory 100 of the motion vector search apparatus 1, the reference frame (P-VOP) is stored in the frame memory 101, and the motion vectors of the preceding frame are stored in the motion vector memory 102 (step S61).

Next, the general motion vector search unit 103 refers to the reference frame stored in the frame memory 101 and executes a motion vector search for each of the eight predetermined specific macro blocks 31-38 that are stored in the frame memory 100 (step S62). Based on the motion vector searched for each of the specific macro blocks 31-38, the general motion vector search unit 103 determines and outputs search sequence pattern numbers. The procedure to determine the search sequence pattern numbers is described in detail later.

The motion vector search unit 104 determines the beginning position of the search based on the motion vector, which is stored in the motion vector memory 102, of the macro block that is set at the same position in the preceding frame. Next, based on the search sequence pattern number from the general motion vector search unit 103, the motion vector search unit 104 refers to the search sequence pattern in the search sequence table 105 and performs a motion vector search according to the search sequence of the search sequence pattern. Lastly, the motion vector search unit 104 outputs prediction macro blocks selected as a result of the search, as well as the motion vectors for the prediction macro blocks (step S63).

Figure 7:
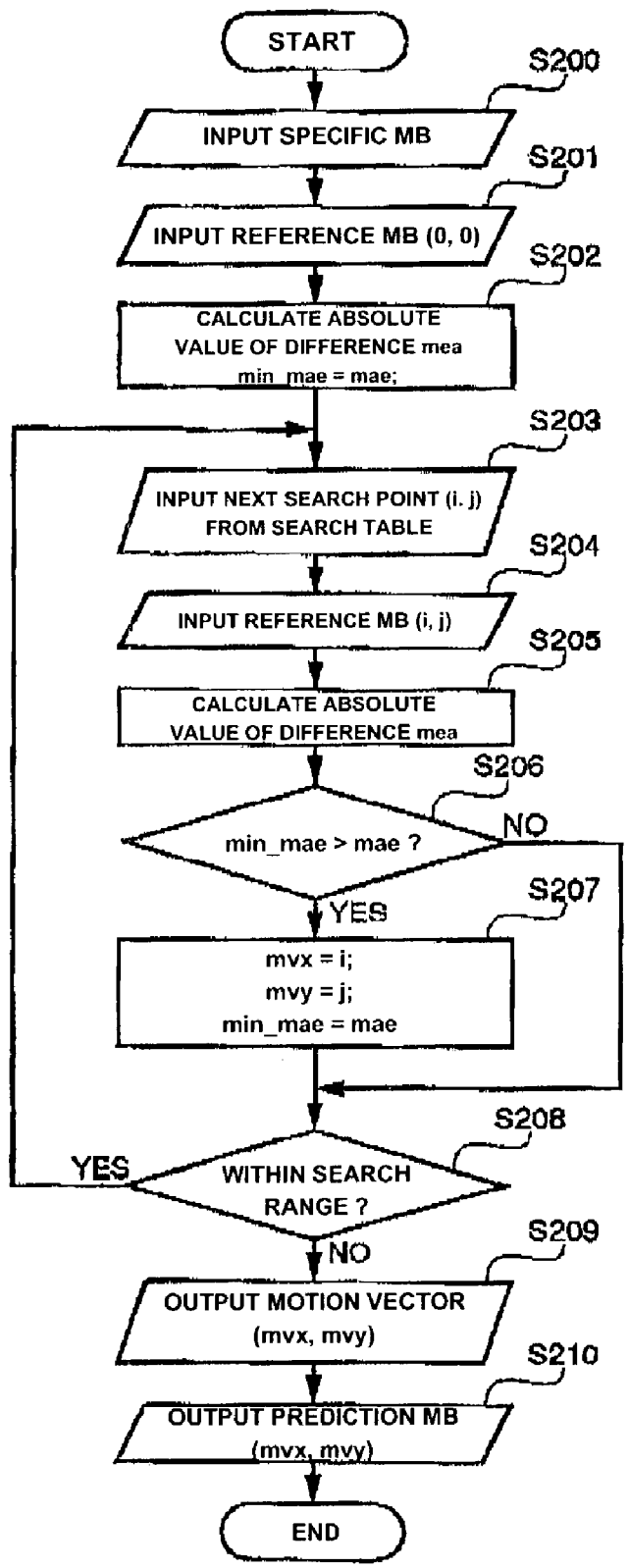
FIG. 7 is a flowchart for describing a procedure performed by a general motion vector search unit 103 in FIG. 1 to search for a motion vector for each macro block.
Figure 8:
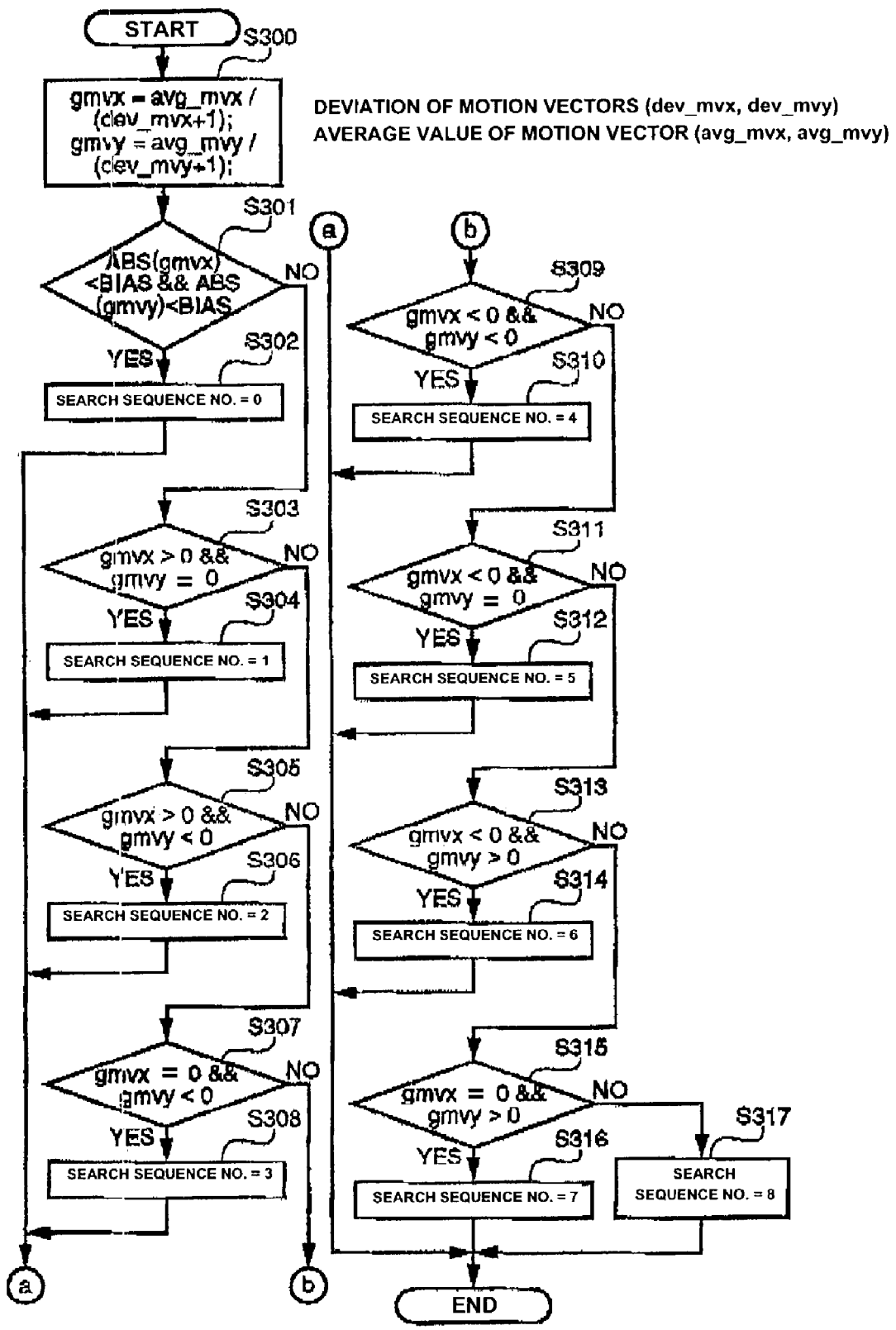
FIG. 8 is a flowchart for describing a procedure performed by the general motion vector search unit 103 in FIG. 1 to determine a search sequence pattern.

FIG. 7 is a flowchart that describes a procedure performed by the general motion vector search unit 103 in FIG. 1 to search for a motion vector for each macro block. FIG. 8 is a flowchart that describes a procedure performed by the general motion vector search unit 103 in FIG. 1 to determine a search sequence pattern. The processing in the two flowcharts in FIGS. 7 and 8 corresponds to step S62 in the flowchart in FIG. 6.

First, a motion vector search is performed for each of the eight specific macro blocks shown in FIG. 3. Initially, this motion vector search starts with a search sequence pattern shown in FIG. 4 whose search sequence pattern number registered in the search sequence table 105 is "0". In other words, a specific macro block is inputted (step S200), and a reference macro block in the position of the reference frame that corresponds to the specific macro block is inputted (step S201).

Next, an absolute value of difference mae between the two frames at the search point (0, 0) of the search sequence pattern "0" for the specific macro block and the reference macro block inputted is calculated, and the value is substituted for min_mae (step S202). This value becomes the initial value of min_mae. The specific macro block is retained in the general motion vector search unit 103.

The pixel value of the specific macro block of the next search point (i, j) according to the search sequence pattern "0" is inputted (step S203). The pixel value of the same position in the reference macro block is inputted (step S204).

Next, the absolute value of difference mae between the pixel value of the reference macro block and the pixel value of the specific macro block is calculated (step S205). The sizes of min_mae and mae are compared (step S206). If min_mae is found, as a result of the comparison, to be larger than mae (YES), (i, j) is substituted for the motion vector (mvx, mvy) and mae is substituted for min_mae (step S207).

Steps S203 through S207 are repeated until the search sequence reaches outside the search range (step S208). When all of the search processing is completed within the search range, the motion vector retained (mvx, mvy) is outputted (step S209). In addition, the reference macro block (mvx, mvy) is outputted as a prediction macro block (step S210).

Next, a general motion vector (gmvx, gmvy) is obtained from the deviation among the eight motion vectors found (dev_mvx, dev_mvy) and the average of the eight motion vectors (avg_mvx, avg_mvy) (step S300). In the steps that follow, a search pattern number that defines a pattern of the search sequence is found from the direction of the general motion vector.

First, the absolute value of the general motion vector is compared with a threshold BIAS given in advance (step S301). If, as a result of the comparison, the absolute value of the general motion vector is found to be smaller (YES), the search sequence pattern number is set to "0" (step S302). On the other hand, if the absolute value of the general motion vector is larger (NO), whether gmvx>0 and gmvy=0 are true or false is determined (step S303).

If the result of the determination made in step S303 is true (YES), the search sequence pattern number is set to "1" (step S304). On the other hand, if the determination result is false (NO), whether gmvx>0 and gmvy<0 are true or false is determined (step S305).

If the result of the determination made in step S305 is true (YES), the search sequence pattern number is set to "2" (step S306). On the other hand, if the determination result is false (NO), whether gmvx=0 and gmvy<0 are true or false is determined (step S307).

If the result of the determination made in step S307 is true (YES), the search sequence pattern number becomes "3" (step S308). On the other hand, if the determination result is false (NO), whether gmvx<0 and gmvy<0 are true or false is determined (step S309).

If the result of the determination made in step S309 is true (YES), the search sequence pattern number becomes "4" (step S310). On the other hand, if the determination result is false (NO), whether gmvx<0 and gmvy=0 are true or false is determined (step S311).

If the result of the determination made in step S311 is true (YES), the search sequence pattern number becomes "5" (step S312). On the other hand, if the determination result is false (NO), whether gmvx<0 and gmvy>0 are true or false is determined (step S313).

If the result of the determination made in step S313 is true (YES), the search sequence pattern number becomes "6" (step S314). On the other hand, if the determination result is false (NO), whether gmvx=0 and gmvy>0 are true or false is determined (step S315).

If the result of the determination made in step S315 is true (YES), the search sequence pattern number becomes "7" (step S316). On the other hand, if the determination result is false (NO), the search sequence pattern number becomes "8" (step S317).

The motion vector search procedure performed by the motion vector search unit 104 in FIG. 1 is similar to the procedure shown in FIG. 7.

Figure 9:
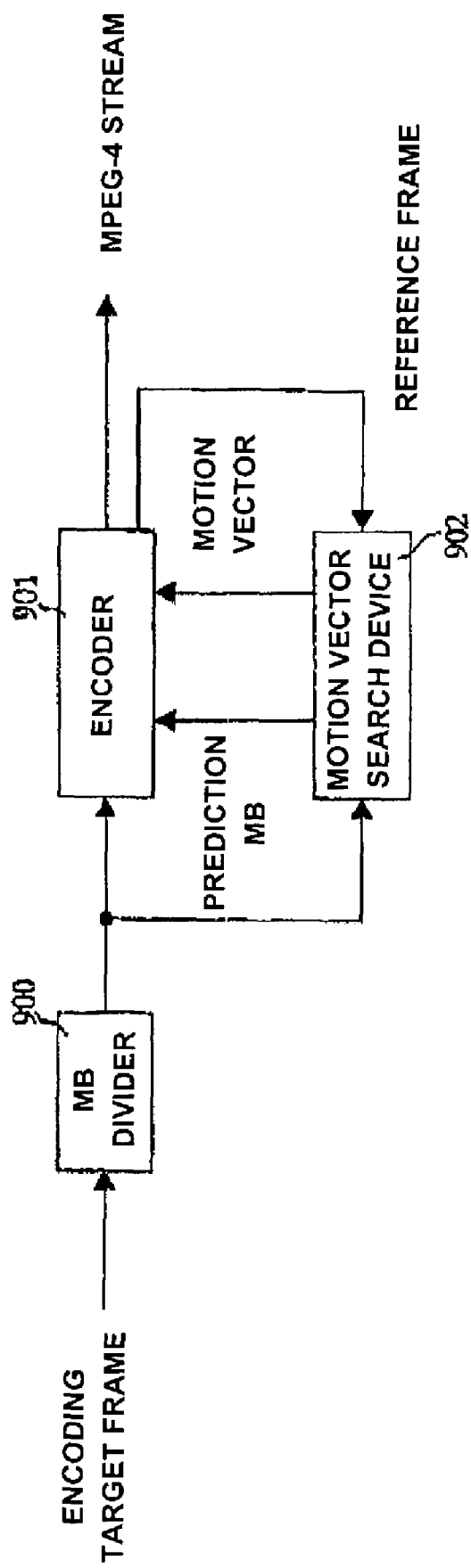
FIG. 9 is a block diagram of a structure of an encoding apparatus with the motion vector search apparatus in FIG. 1.

FIG. 9 is a block diagram of the structure of an encoding apparatus provided with the motion vector search apparatus in FIG. 1.

In FIG. 9, an MB dividing device 900 divides a frame picture inputted into units of MBs. An encoder 901 predictively encodes current MBs based on a predictive MB obtained from a motion vector search device 902. The encoder 901 also encodes a motion vector obtained from the motion vector search device 902. The motion vector search device 902 corresponds to the motion vector search apparatus in FIG. 1.

Next, operations of an encoding apparatus having the structure shown in FIG. 9 will be described.

First, a frame that is the target of encoding is inputted, and the inputted frame picture is divided into MBs by the MB dividing device 900. The encoder 901 encodes the inputted MBs according to the MPEG-4 encoding method (ISO/IEC 14496-2). MBs that have undergone localized decoding are transferred from the encoder 901 and stored in the motion vector search device 902 as a reference frame to be used when encoding the next frame. When processing the next frame, motion vector searches as described earlier are performed based on the MBs of the reference frame stored in the motion vector search device 902 and of the current frame inputted, and prediction MBs and their motion vectors are outputted. This operation is repeated.

In the present embodiment the MPEG-4 encoding method is used as an example of the application of the motion vector search apparatus, but the application of the present invention is not limited to this encoding method and can be applied to a motion compensation inter-picture prediction encoding method as well.

Furthermore, although a general motion vector search is executed on the entire P-VOPs in the present embodiment, the general motion vector search can be executed at an appropriate frame cycle, such as at an interval of a few frames.

Although the number of specific macro blocks is eight according to the present embodiment, the number is not limited to this and may be other numbers. In addition, the positions of the specific macro blocks are indicated in FIG. 3, but the positions may be otherwise.

Moreover, although a spiral search sequence is applied to the motion vector search according to the present embodiment, other search sequences may be used. In addition, although a difference evaluation value that evaluates the similarity between the encoding target macro block and the reference macro block is used as the difference absolute value when searching for a motion vector, values that use other evaluation functions can be used.

Figure 10:
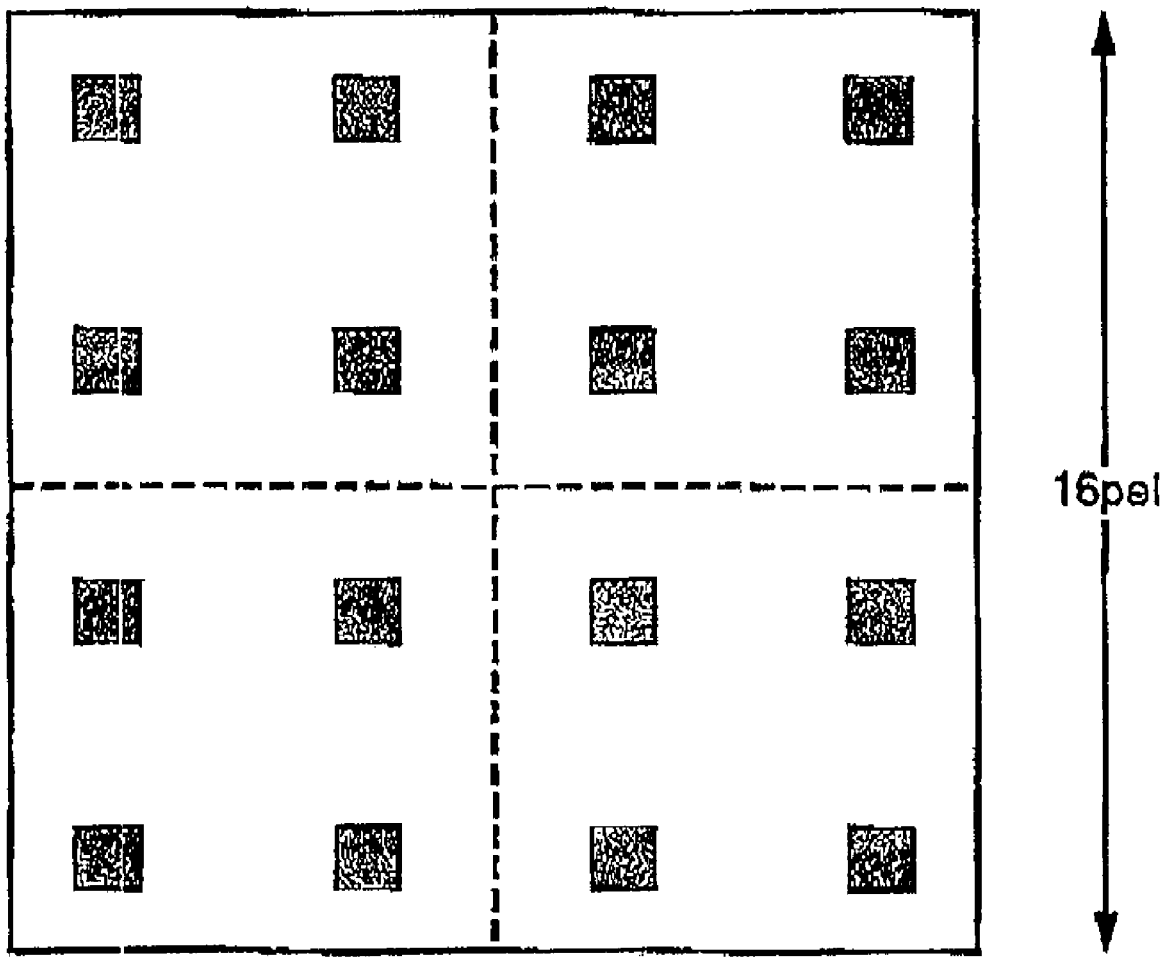
FIG. 10 is a diagram for describing sub-sampled macro blocks.

Blocks resulting from sub-sampling a target block and a reference block used in the first embodiment may be used (see FIG. 10).

As described above, instead of calculating motion vectors for all of the pixels in a block as done conventionally, a motion vector for a frame as a whole is detected according to the present embodiment by targeting a limited number of macro blocks. By limiting, based on the result of the detection, the sequence and range of the motion vector search for macro blocks of the entire frame that is the target of encoding, a motion vector search method with reduced number of searches but that is high-speed and appropriate can be provided.

Second Embodiment

Figure 11:
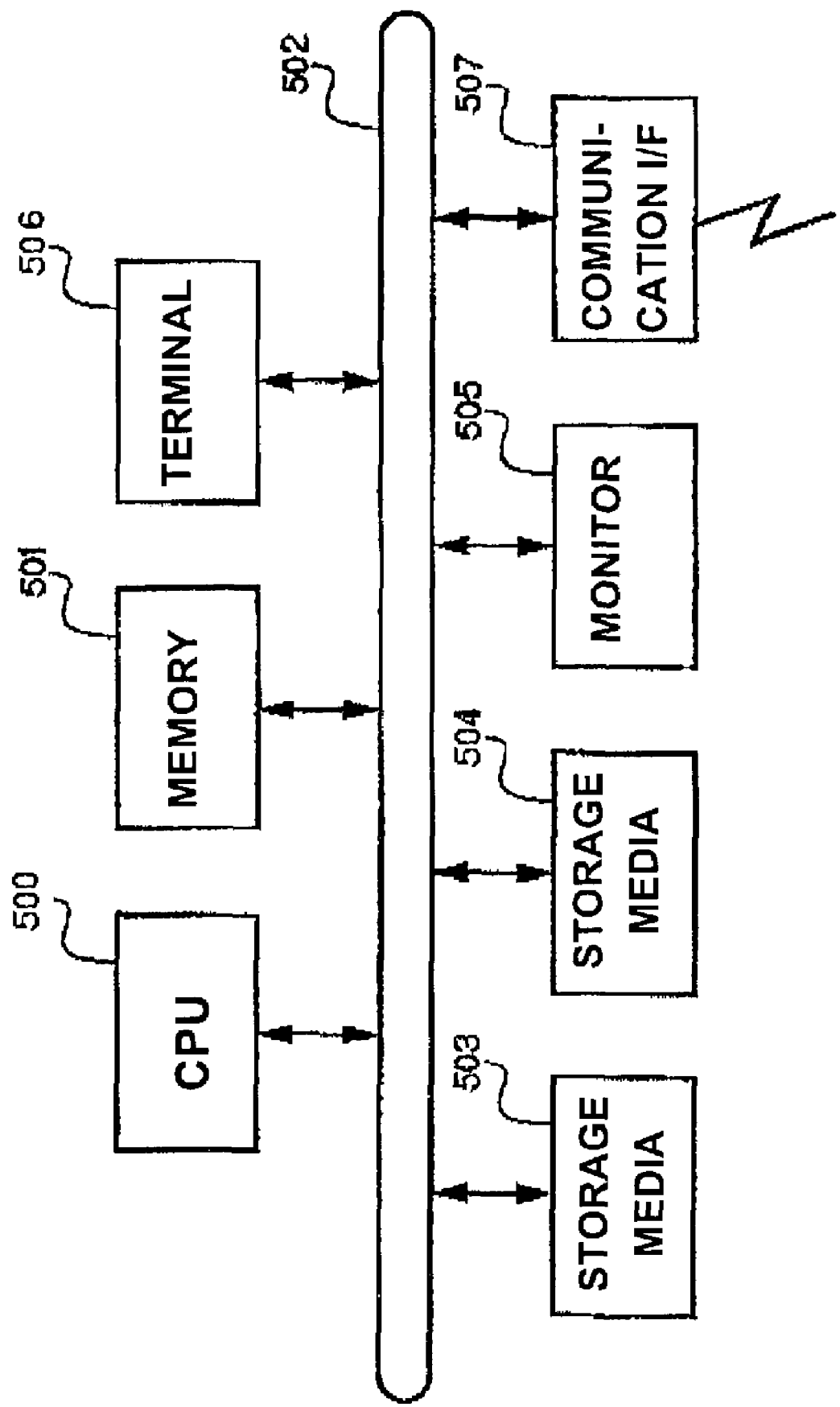
FIG. 11 is a block diagram of a structure of a computer that realizes the motion vector search apparatus.

FIG. 11 is a block diagram of the detailed structure of a computer that realizes the motion vector search apparatus described above. In FIG. 11, a central processing unit (CPU) 500 controls and performs various processing of the entire computer. A memory 501 provides storage regions required for software, data and an operating system (OS) and operations, which are required to control the computer.

The memory 501 is also used as a work area when the CPU 500 performs various processing. In other words, the memory 501 stores the OS to control the entire computer and to operate various software, as well as software to be operated; it also has an area to read video data to be encoded, an encoding area to temporarily store encoding data, and a working area to store parameters for various operations.

A storage apparatus (a storage medium) 503 stores various software, and a storage apparatus (a storage medium) 504 stores moving picture data. A monitor 505 displays pictures and system messages from the computer.

A communications interface (I/F) 507 transmits encoding data to a communications circuit 508, not shown. The communications I/F 507 is connected to a LAN, public telephone line, wireless communications or broadcast airwave external to the motion vector search apparatus realized with the computer. A terminal 506 is used to activate the computer and set various conditions, such as bit rate.

The CPU 500, the memory 501, the terminal 506, the storage apparatuses (storage media) 503 and 504, the monitor 505 and the communications I/F 507 are mutually connected via a bus 502, which allows the various elements to exchange data and control signals with each other.

Figure 12:
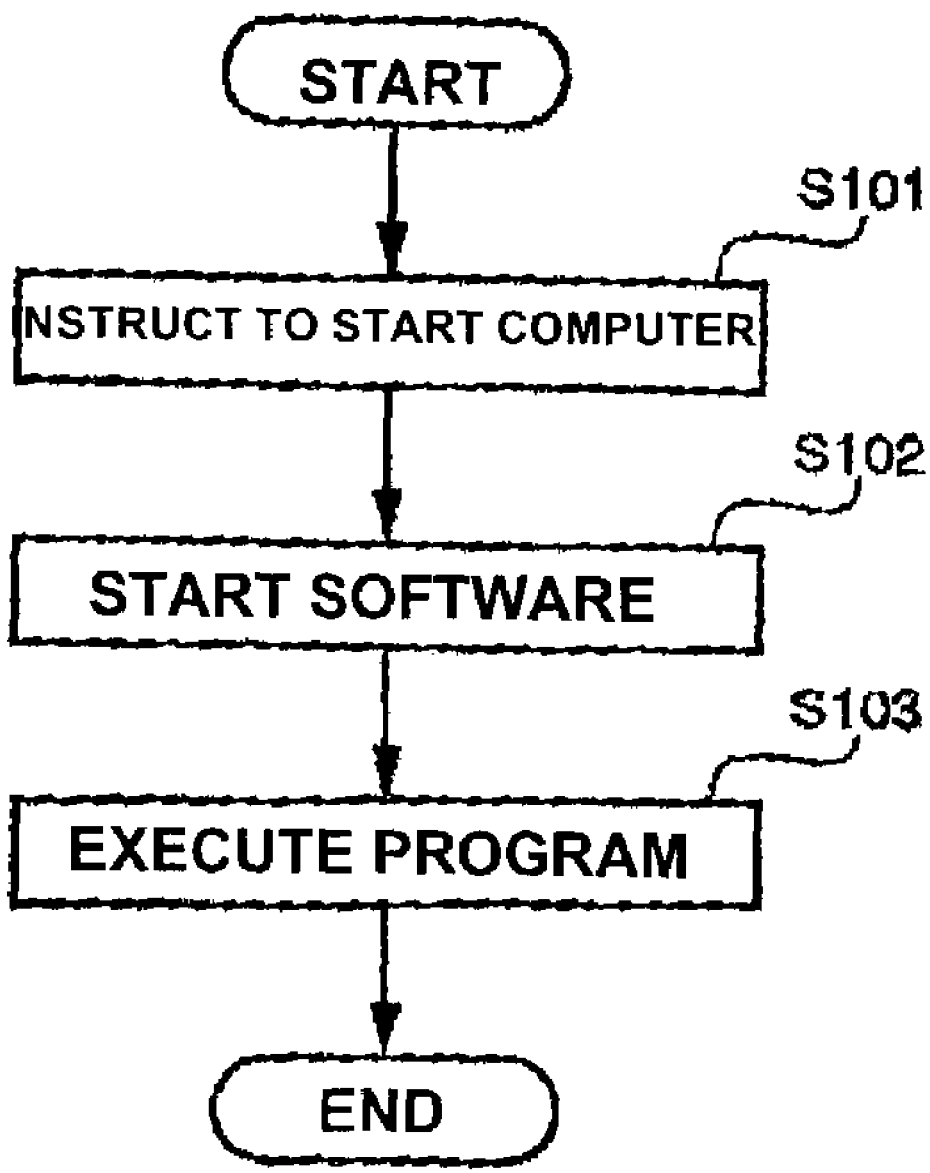
FIG. 12 is a flowchart for describing an operation of the computer with the structure shown in FIG. 11.

FIG. 12 is a flowchart that describes the operations of the computer configured as shown in FIG. 11.

First, moving picture data to be encoded is selected through the terminal 506 from among moving picture data stored in the storage apparatus 504, and the computer is instructed to be activated (step S101). With the activation of the computer, the software stored in the storage apparatus 503 is developed in the memory 501 via the bus 502 and activated (step S102).

The CPU 500 encodes the moving picture data stored in the storage apparatus 504 by executing program codes (i.e., the software) according to the flowcharts shown in FIGS. 7 and 8 (step S103). Based on the above description, the computer according to the present embodiment can function as a motion vector search apparatus that realizes the motion vector search according to the first embodiment.

The present invention may be applicable to a system that is composed of a plurality of apparatuses (for example, a host computer, interface devices, readers, printers and the like), or to a unit that is composed of a single apparatus (for example, a copy machine, a facsimile machine or the like).

The present invention can be achieved by having a storage medium that stores program codes of software that realize the functions of the embodiments described above supplied to a system or an apparatus, and by having a computer (or a CPU or an MPU) of the system or the apparatus read and execute the program codes stored in the storage medium. In this case, the program codes themselves that are read from the storage medium realize the functions of the embodiment of the present invention, and the storage medium that stores the program codes constitute the present invention.

The storage medium to supply the program codes may be, for example, a flexible disk, a hard disk, an optical disk, an optical magnetic disk, a DVD, a CD-ROM, a CD-R, a magnetic tape, a nonvolatile memory card, or a ROM.

Furthermore, the present invention is applicable not only when the program codes read by a computer are executed to realize the functions of the embodiments, but also when an operating system that operates on the computer performs a part or all of the actual processing based on the instructions contained in the program codes and thereby realizes the functions of the embodiments.

Moreover, the present invention is also applicable when the program codes that are read from the storage medium are written on a memory of an expansion board inserted into a computer or of an expansion unit connected to a computer, and a CPU provided on the expansion board or on the expansion unit performs a part or all of the actual processing based on the instructions contained in the program codes and thereby realizes the functions of the embodiments.

As described above, in accordance with the embodiments of the present invention, synchronization control information appended to media data and synchronization control information appended to IPMP information are synchronized, and information that indicates timings to start processings that are defined by the IPMP information are generated in association with the respective synchronization control information. As a result, processings for intellectual property management can be flexibly performed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motion vector search apparatus that searches for inter-frame motion vectors of motion pictures, the motion vector search apparatus comprising:
   a target frame input component that inputs a search target frame to be coded;
   a reference frame input component that inputs as a reference frame a frame on which a motion vector search has been performed;
   a search pattern determination component that uses each of a plurality of specific blocks set within the search target frame and each corresponding one of reference blocks set within the reference frame to perform a block matching for each of the specific blocks within a predetermined range of the reference frame and determine a search pattern for a motion vector for the entire frame according to block matching results for the plurality of specific blocks; and
   a motion vector search component that uses the search pattern determined by the search pattern determination component to execute a block matching in predetermined units of blocks on the inputted search target frame to be coded and generate motion vectors,
   wherein the search pattern determination component comprises:
   a difference calculation component that calculates difference information of a difference between each of the specific blocks and each of the corresponding reference blocks;
   a component that determines a reference block that matches each of the specific blocks according to the difference information obtained by the difference calculation component, and outputs motion vectors of the specific blocks, respectively;
   a general motion vector calculation component that calculates a general motion vector of the entire frame from the motion vectors of the plurality of specific blocks; and
   a pattern determination component that determines a search pattern according to the general motion vector, and
   wherein the general motion vector calculation component comprises:
   a deviation calculation component that calculates a deviation among the motion vectors of the plurality of specific blocks;
   an average calculation component that calculates an average of the motion vectors of the plurality of specific blocks; and
   a general calculation component that calculates a general motion vector of the entire frame from the deviation and the average of the motion vectors of the plurality of specific blocks calculated.

2. A motion vector search apparatus according to claim 1, wherein the motion vector search component outputs matched reference blocks as prediction blocks with the motion vectors.

3. A motion vector search apparatus according to claim 2, further comprising an encoding component that predictively encodes the search target frame, using the prediction blocks outputted from the motion vector search component.

4. A motion vector search method to search for inter-frame motion vectors of motion pictures, the motion vector search method comprising:
   a target frame input step of inputting a search target frame;
   a reference frame input step of inputting as a reference frame a frame on which a motion vector search has been performed;
   a search pattern determination step of, by using each of a plurality of specific blocks set within the search target frame and each corresponding one of reference blocks set within the reference frame, performing a block matching for each of the specific blocks within a predetermined range of the reference frame and determining a search pattern for a motion vector for the entire frame according to block matching results for the plurality of specific blocks; and
   a motion vector searching step of executing a block matching in predetermined units of blocks on the inputted search target frame to be coded and generate motion vectors by using the search pattern determined in the search pattern determination step,
   wherein the search pattern determination step comprises:
   a difference calculation step for calculating difference information of a difference between each of the specific blocks and each of the corresponding reference blocks;
   a step for determining a reference block that matches each of the specific blocks according to the difference information obtained in the difference calculation step, and outputting motion vectors of the specific blocks, respectively;

a general motion vector calculation step of calculating a general motion vector of the entire frame from the motion vectors of the plurality of specific blocks; and a pattern determination step of determining a search pattern according to the general motion vector, and wherein the general motion vector calculation step comprises:

a deviation calculation step of calculating a deviation among the motion vectors of the plurality of specific blocks;

an average calculation step of calculating an average of the motion vectors of the plurality of specific blocks; and a general calculation step of calculating a general motion vector of the entire frame from the deviation and the average of the motion vectors of the plurality of specific blocks calculated.

5. A motion vector search method according to claim 4, wherein the motion vector search step includes outputting matched reference blocks as prediction blocks with the motion vectors.

6. A motion vector search method according to claim 5, further comprising an encoding step of predictively encoding the search target frame, using the prediction blocks outputted in the motion vector search step.

7. A program embedded in computer-readable storage medium that controls a computer to execute a motion vector search method to search for inter-frame motion vectors of motion pictures, the motion vector search method comprising:

a target frame input step of inputting a search target frame;

a reference frame input step of inputting as a reference frame a frame on which a motion vector search has been performed;

a search pattern determination step of, by using each of a plurality of specific blocks set within the search target frame and each corresponding one of reference blocks set within the reference frame, performing a block matching for each of the specific blocks within a predetermined range of the reference frame and determining a search pattern for a motion vector for the entire frame according to block matching results for the plurality of specific blocks; and a motion vector searching step of executing a block matching in predetermined units of blocks on the inputted search target frame to be coded and generate motion vectors by using the search pattern determined in the search pattern determination step, wherein the search pattern determination step comprises:

a difference calculation step for calculating difference information of a difference between each of the specific blocks and each of the corresponding reference blocks;

a step for determining a reference block that matches each of the specific blocks according to the difference information obtained in the difference calculation step, and outputting motion vectors of the specific blocks, respectively;

a general motion vector calculation step of calculating a general motion vector of the entire frame from the motion vectors of the plurality of specific blocks; and a pattern determination step of determining a search pattern according to the general motion vector, and wherein the general motion vector calculation step comprises:

a deviation calculation step of calculating a deviation among the motion vectors of the plurality of specific blocks;

an average calculation step of calculating an average of the motion vectors of the plurality of specific blocks; and a general calculation step of calculating a general motion vector of the entire frame from the deviation and the average of the motion vectors of the plurality of specific blocks calculated.

* * * * *